US011084162B1

(12) United States Patent
Liu

(10) Patent No.: US 11,084,162 B1
(45) Date of Patent: Aug. 10, 2021

(54) BICYCLE REPAIR STAND

(71) Applicant: Yao-Huang Liu, Tainan (TW)

(72) Inventor: Yao-Huang Liu, Tainan (TW)

(*) Notice: Subject to any disclaimer, the term of this patent is extended or adjusted under 35 U.S.C. 154(b) by 0 days.

(21) Appl. No.: 16/936,916

(22) Filed: Jul. 23, 2020

(51) Int. Cl.
B25H 1/00 (2006.01)
B62H 3/00 (2006.01)

(52) U.S. Cl.
CPC ............ *B25H 1/0014* (2013.01); *B62H 3/00* (2013.01)

(58) Field of Classification Search
CPC ... B25H 3/00; B25H 3/02; B25H 3/04; B25H 3/06; B25H 3/10; B25H 3/12; B25H 1/0014; B60R 9/08; B60R 9/10
See application file for complete search history.

(56) References Cited

U.S. PATENT DOCUMENTS

| 605,429 | A | * | 6/1898 | Howard | B62H 3/00 211/22 |
|---|---|---|---|---|---|
| 2,485,641 | A | * | 10/1949 | Nelson | B25B 1/22 269/192 |
| 2,855,964 | A | * | 10/1958 | Zelazny | B25B 5/125 269/215 |
| 3,514,091 | A | * | 5/1970 | Engstrom | B25H 1/0014 269/68 |
| 3,934,436 | A | * | 1/1976 | Candlin | B62H 3/00 70/234 |
| 3,947,010 | A | * | 3/1976 | Zeller | B25H 1/0007 269/100 |
| 3,981,491 | A | * | 9/1976 | Snyder | B25B 5/147 269/64 |
| 4,253,648 | A | * | 3/1981 | Meeks | B25B 5/006 269/203 |
| 5,277,346 | A | * | 1/1994 | Stier | B60R 9/048 224/509 |
| 5,996,814 | A | * | 12/1999 | Workman | B25H 1/0014 211/22 |
| 6,547,116 | B2 | * | 4/2003 | Anderson | B60R 9/06 224/506 |
| D556,530 | S | * | 12/2007 | Workman | D8/72 |
| 8,342,495 | B2 | * | 1/2013 | Weissenborn | A63C 11/26 269/101 |
| 8,893,897 | B2 | * | 11/2014 | Workman | B25B 5/003 211/17 |
| 10,174,773 | B2 | * | 1/2019 | Wang | B60R 9/10 |

(Continued)

*Primary Examiner* — Patrick D Hawn
(74) *Attorney, Agent, or Firm* — Karin L. Williams; Alan D. Kamrath; Mayer & Williams PC

(57) ABSTRACT

A bicycle repair stand contains a fitting sleeve, a retainer, a presser, at least one movable drive member, at least one screw bolt, and at least two positioning elements. The fitting sleeve includes a channel and a connection portion. The retainer includes a slidable conduit, at least one locking protrusion, and a press chamber. The press chamber has a cover, at least one pressing orifice, at least one coupling orifice, at least one receiving orifice, and a connection shaft. The presser includes at least one button, at least one engagement portion, a projected tooth, at least one groove, and at least one resilient element. A respective movable drive member includes at least one sidle portion, at least one trench, and a movable fixing portion. A respective screw bolt includes a ratable handle and a threaded section. The screwing section has threads, and a respective positioning element includes a spring.

4 Claims, 8 Drawing Sheets

(56) References Cited

U.S. PATENT DOCUMENTS

| | | | | |
|---|---|---|---|---|
| 2004/0046091 A1* | 3/2004 | Chuang | ................ | B25B 1/2484 |
| | | | | 248/125.1 |
| 2007/0057001 A1* | 3/2007 | Wang | ....................... | B60R 9/10 |
| | | | | 224/536 |
| 2008/0203255 A1* | 8/2008 | Workman | ............ | B25H 1/0014 |
| | | | | 248/231.61 |
| 2010/0164158 A1* | 7/2010 | Weissenborn | .......... | F41A 23/18 |
| | | | | 269/101 |
| 2016/0297063 A1* | 10/2016 | Chuang | ............... | B25H 1/0014 |

\* cited by examiner

BICYCLE REPAIR STAND

BACKGROUND OF THE INVENTION

Field of the Invention

The present invention relates to a bicycle repair stand, and more particularly to the bicycle repair stand which is capable of hanging a bicycle to repair the bicycle easily.

Description of the Prior Art

Referring to FIG. 1, a conventional bicycle repair stand 10 contains a body 101, a retainer 102 mounted on the body 101, a presser 103 fixed on a rear end of the first retainer 102, an actuation mechanism 104 operated by using the presser 103, two springs 105 arranged on the actuation mechanism 104 and configured to control a paw 106 to engage with a screw bolt 20. A movable drive member 30 is inserted on a front end of the screw bolt 20 and includes a movable clamper 301 corresponding to the retainer 102, and the screw bolt 20 includes a rotatable handle 201 disposed on a front end thereof via the movable drive member 30.

However, the conventional bicycle repair 10 is complicated, and the actuation mechanism 104 is manufactured at a high cost. In addition, the conventional bicycle repair stand 10 is connected difficultly and time-consumingly, thus having high assembly cost and difficult maintenance, as shown in FIG. 1.

The present invention has arisen to mitigate and/or obviate the afore-described disadvantages.

SUMMARY OF THE INVENTION

The primary object of the present invention is to provide a bicycle repair stand which contains at least one fitting sleeve, at least one retainer, at least one presser, at least one movable drive member, at least one screw bolt, and at least two positioning elements, wherein a respective presser engages with threads of screwing section by using a projected tooth so as to simplify the bicycle repair stand and to fix the bicycle repair easily.

To provide above-mentioned objects, a bicycle repair stand provided by the present invention contains a fitting sleeve, a retainer, a presser, at least one movable drive member, at least one screw bolt, and at least two positioning elements.

The fitting sleeve includes a channel passing therethrough and a connection portion formed on a rear end of the respective fitting sleeve and configured to close the channel.

The retainer is engaged with a front end of the fitting sleeve, and the retainer includes a slidable conduit communicating with the channel of the fitting sleeve, at least one locking protrusion extending from a top of the retainer, and a press chamber formed on a rear end of a respective locking protrusion, wherein the press chamber has a cover covered on a top thereof, at least one pressing orifice defined on a front end of the cover, at least one coupling orifice defined on a bottom of the press chamber and communicating with the slidable conduit, at least one receiving orifice defined on a rear end of the cover and extending between a respective pressing orifice and a respective coupling orifice, and a connection shaft received in a respective receiving orifice.

The presser is rotatably connected in the press chamber by ways of the connection shaft, and the respective presser includes at least one button obliquely extending upward from a front end thereof, at least one engagement portion extending into the slidable conduit downward via the respective coupling orifice, a projected tooth formed on a bottom of a respective engagement portion, at least one groove defined on a top of the respective engagement portion and corresponding to the projected tooth, and at least one resilient element accommodated in the at least one groove and abutting against the respective retainer.

A respective movable drive member includes at least one sidle portion formed on a rear end thereof, and a respective slide portion extends into the channel of the respective fitting sleeve via the slidable conduit, at least one trench defined on a top of the at least one sidle portion and configured to receive the at least one engagement portion, and a movable fixing portion formed on a front end of the respective movable drive member and corresponding to the respective locking protrusion.

A respective screw bolt is rotatably connected with the movable fixing portion, and the respective screw bolt includes a ratable handle mounted on a front end of the movable fixing portion, a threaded section formed on a rear end of the respective screw bolt which passes through the movable fixing portion, wherein the screwing section has threads formed thereon and engaged with the projected tooth of a respective engagement portion.

A respective positioning element is connected with the connection portion and extends into the channel via the connection portion, wherein the respective positioning element includes a spring fitted thereon and abutting against a respective sidle portion.

The respective sidle portion has at least one support element fixed on a rear end thereof, wherein a respective support element has at least one first aperture, two supporting portions extending outward from two sides of a respective support element, wherein a respective portion has a second aperture defined thereon and coupling with the respective positioning element, and the second aperture contacts with the spring. The respective sidle portion has two recesses defined on two sides thereof and configured to accommodate the two supporting portions, wherein the respective positioning element is screwed with the respective retainer via a respective recess. Furthermore, the respective screw bolt further includes a defining portion formed on a rear end thereof and rotatably connected with a respective first aperture.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
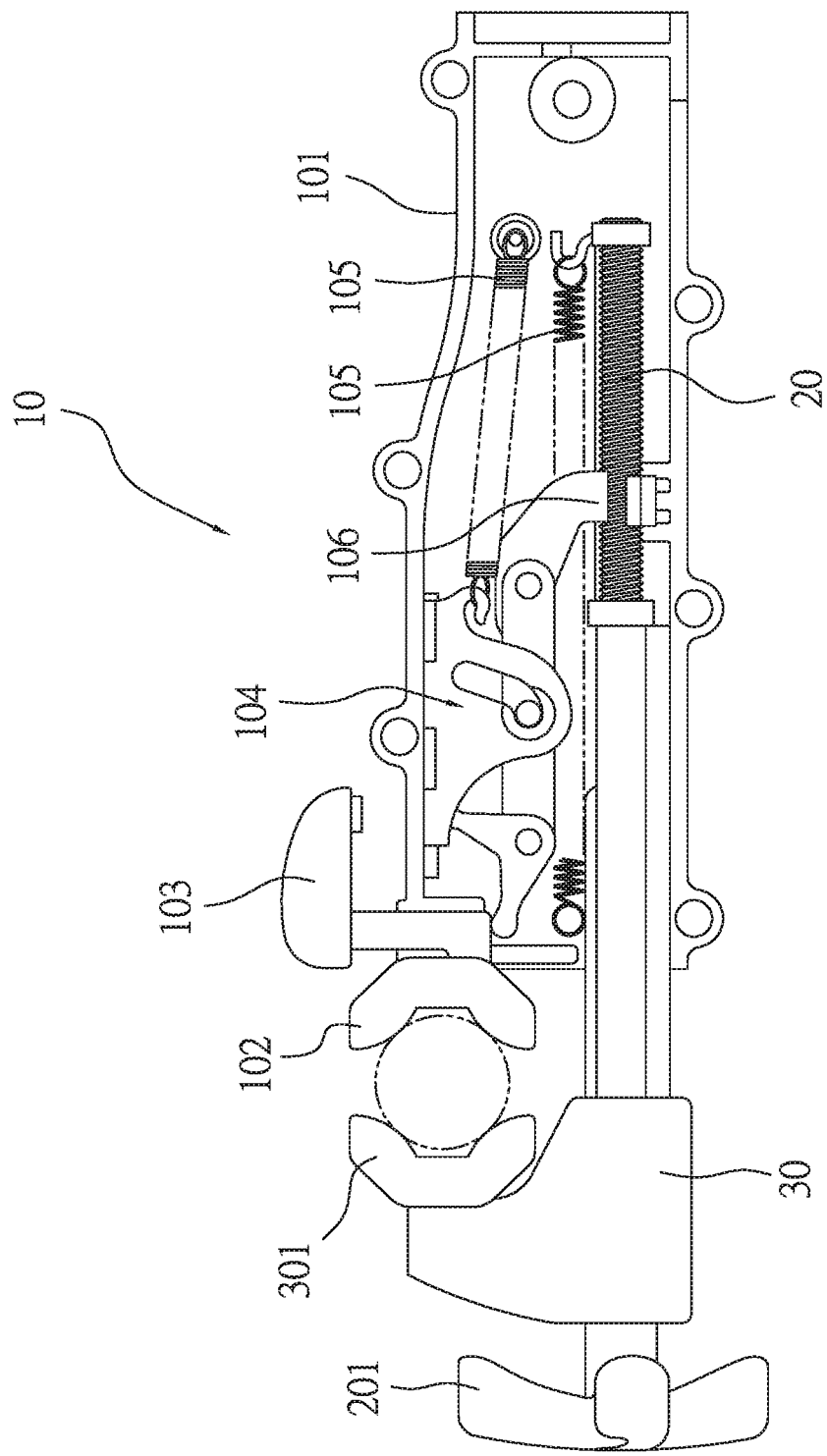
FIG. 1 is a cross sectional view showing the assembly of a conventional bicycle repair stand.
Figure 2:
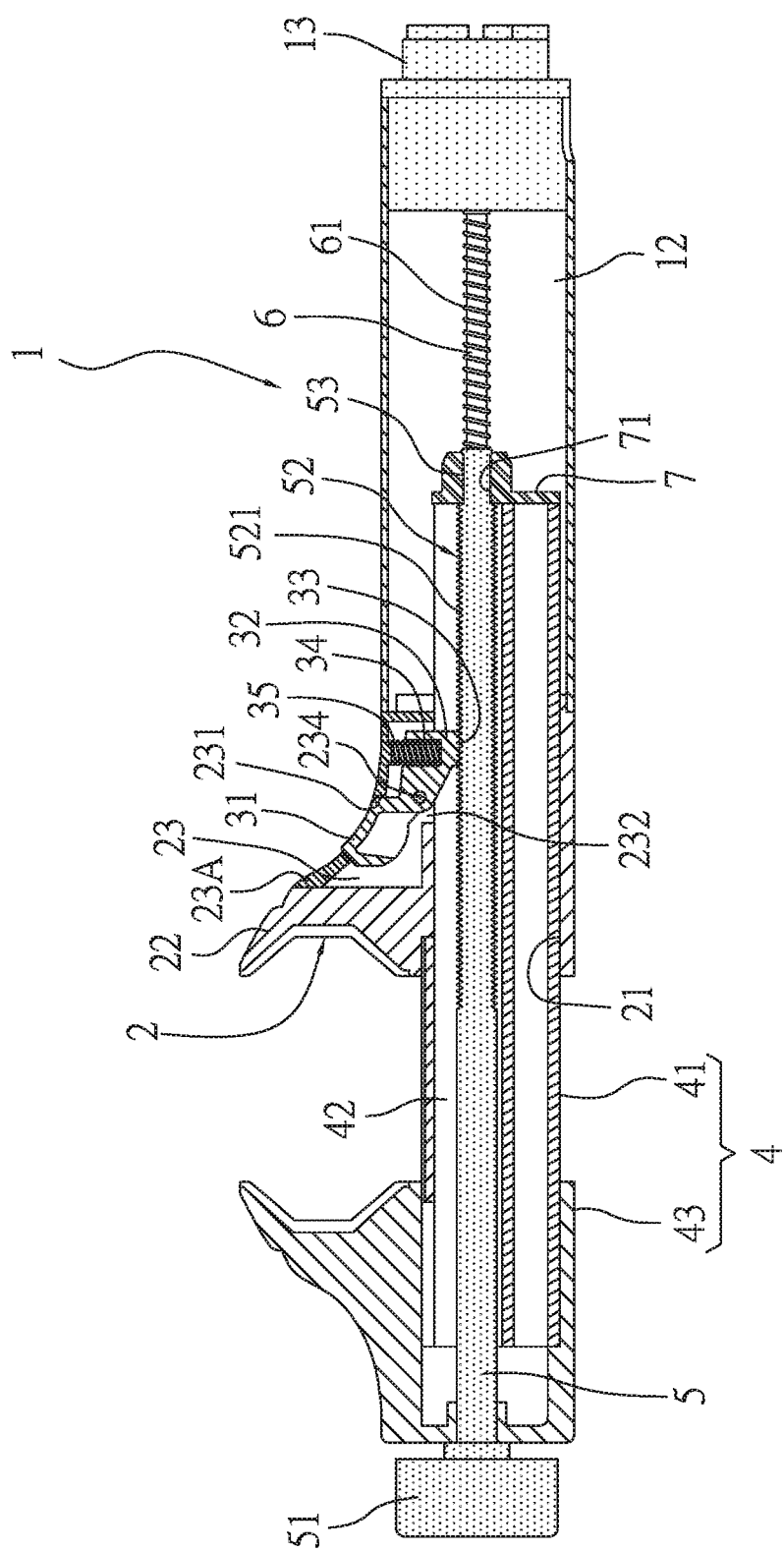
FIG. 2 is a cross sectional view showing the assembly of a conventional bicycle repair stand according to the preferred embodiment of the present invention.
Figure 3:
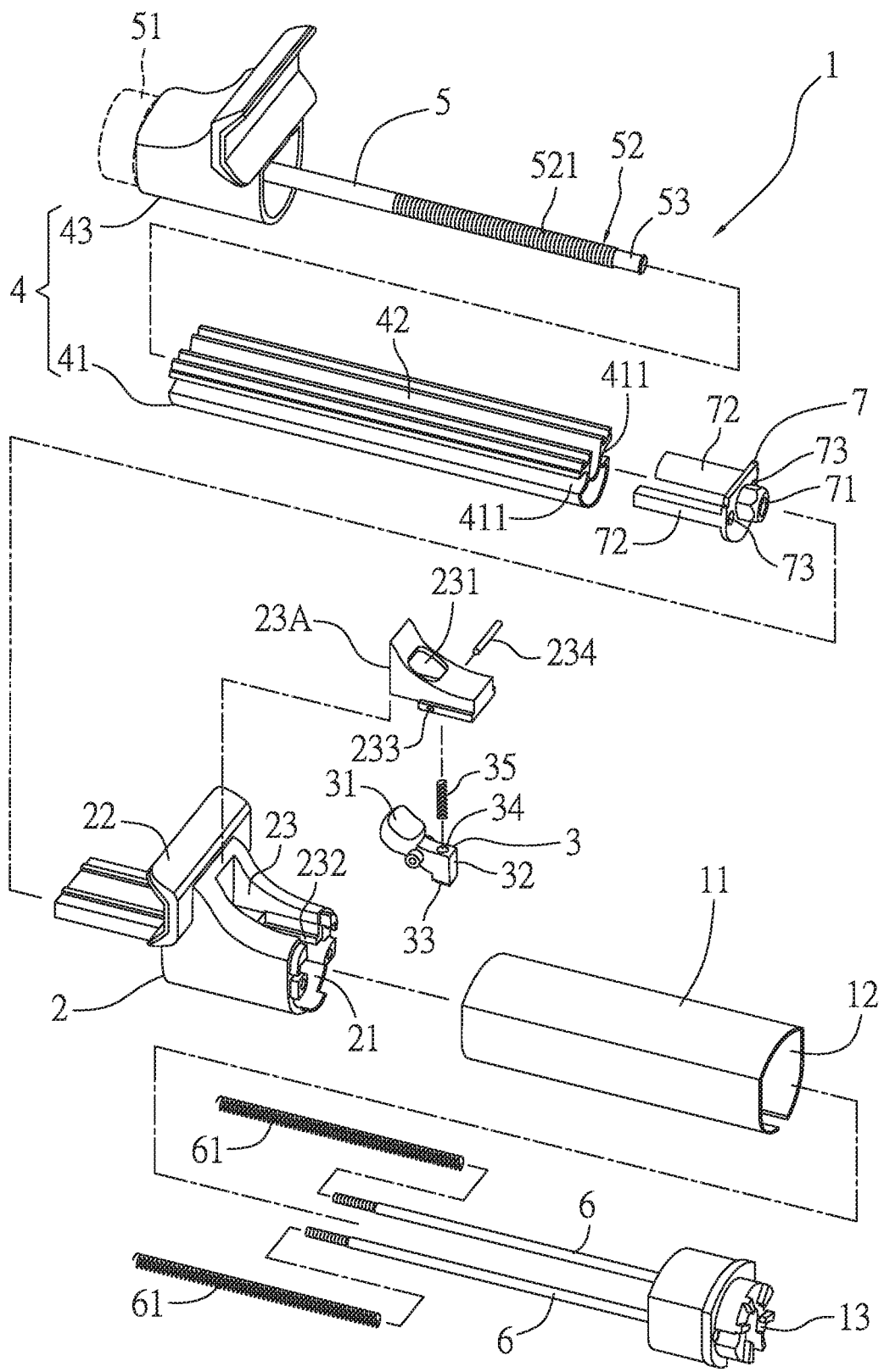
FIG. 3 is a perspective view showing the exploded components of the bicycle repair stand according to the preferred embodiment of the present invention.

With reference to FIGS. 2 and 3, a bicycle repair stand 1 according to a preferred embodiment of the present invention comprises at least one fitting sleeve 11, at least one retainer 2, at least one presser 3, at least one movable drive member 4, at least one screw bolt 5, and at least two positioning elements 6.

A respective fitting sleeve 11 includes a channel 12 passing therethrough and a connection portion 13 formed on a rear end of the respective fitting sleeve 11 and configured to close the channel 12.

A respective retainer 2 is engaged with a front end of the respective fitting sleeve 11, and the respective retainer 2 includes a slidable conduit 21 communicating with the channel 12 of the respective fitting sleeve 11, at least one locking protrusion 22 extending from a top of the respective retainer 2, and a press chamber 23 formed on a rear end of a respective locking protrusion 22, wherein the press chamber 23 has a cover 23A covered on a top thereof, at least one pressing orifice 231 defined on a front end of the cover 23A, at least one coupling orifice 232 defined on a bottom of the press chamber 23 and communicating with the slidable conduit 21, at least one receiving orifice 233 defined on a rear end of the cover 23A and extending between a respective pressing orifice 231 and a respective coupling orifice 232, and a connection shaft 234 received in a respective receiving orifice 233.

A respective presser 3 is rotatably connected in the press chamber 23 by ways of the connection shaft 234, and the respective presser 3 includes at least one button 31 obliquely extending upward from a front end thereof, at least one engagement portion 32 extending into the slidable conduit 21 downward via the respective coupling orifice 232, a projected tooth 33 formed on a bottom of a respective engagement portion 32, at least one groove 34 defined on a top of the respective engagement portion 32 and corresponding to the projected tooth 33, and at least one resilient element 35 accommodated in the at least one groove 34 and abutting against the respective retainer 2.

A respective movable drive member 4 includes at least one sidle portion 41 formed on a rear end thereof, wherein a respective slide portion 41 extends into the channel 12 of the respective fitting sleeve 11 via the slidable conduit 21, at least one trench 42 defined on a top of the at least one sidle portion 41 and configured to receive the at least one engagement portion 32, and a movable fixing portion 43 formed on a front end of the respective movable drive member 4 and corresponding to the respective locking protrusion 22.

A respective screw bolt 5 is rotatably connected with the movable fixing portion 43, and the respective screw bolt 5 includes a ratable handle 51 mounted on a front end of the movable fixing portion 43, a screwing section 52 formed on a rear end of the respective screw bolt 5 which passes through the movable fixing portion 43, wherein the screwing section 52 is accommodated in the respective trench 42 and has threads 521 formed thereon and engaged with the projected tooth 33 of a respective engagement portion 32.

A respective positioning element 6 is connected with the connection portion 13 and extends into the channel 12 via the connection portion 13, wherein the respective positioning element 6 includes a spring 61 fitted thereon and abutting against a respective sidle portion 41.

The respective sidle portion 41 has at least one support element 7 fixed on a rear end thereof, wherein a respective support element 7 has at least one first aperture 71, two supporting portions 72 extending outward from two sides of a respective support element 7, wherein a respective supporting portion 72 has a second aperture 73 defined thereon and coupling with the respective positioning element 6, and the second aperture 73 contacts with the spring 61. The respective sidle portion 41 has two recesses 411 defined on two sides thereof and configured to accommodate the two supporting portions 72, wherein the respective positioning element 6 is screwed with the respective retainer 2 via a respective recess 411. Furthermore, the respective screw bolt 5 further includes a defining portion 53 formed on a rear end thereof and rotatably connected with a respective first aperture 71.

Figure 4:
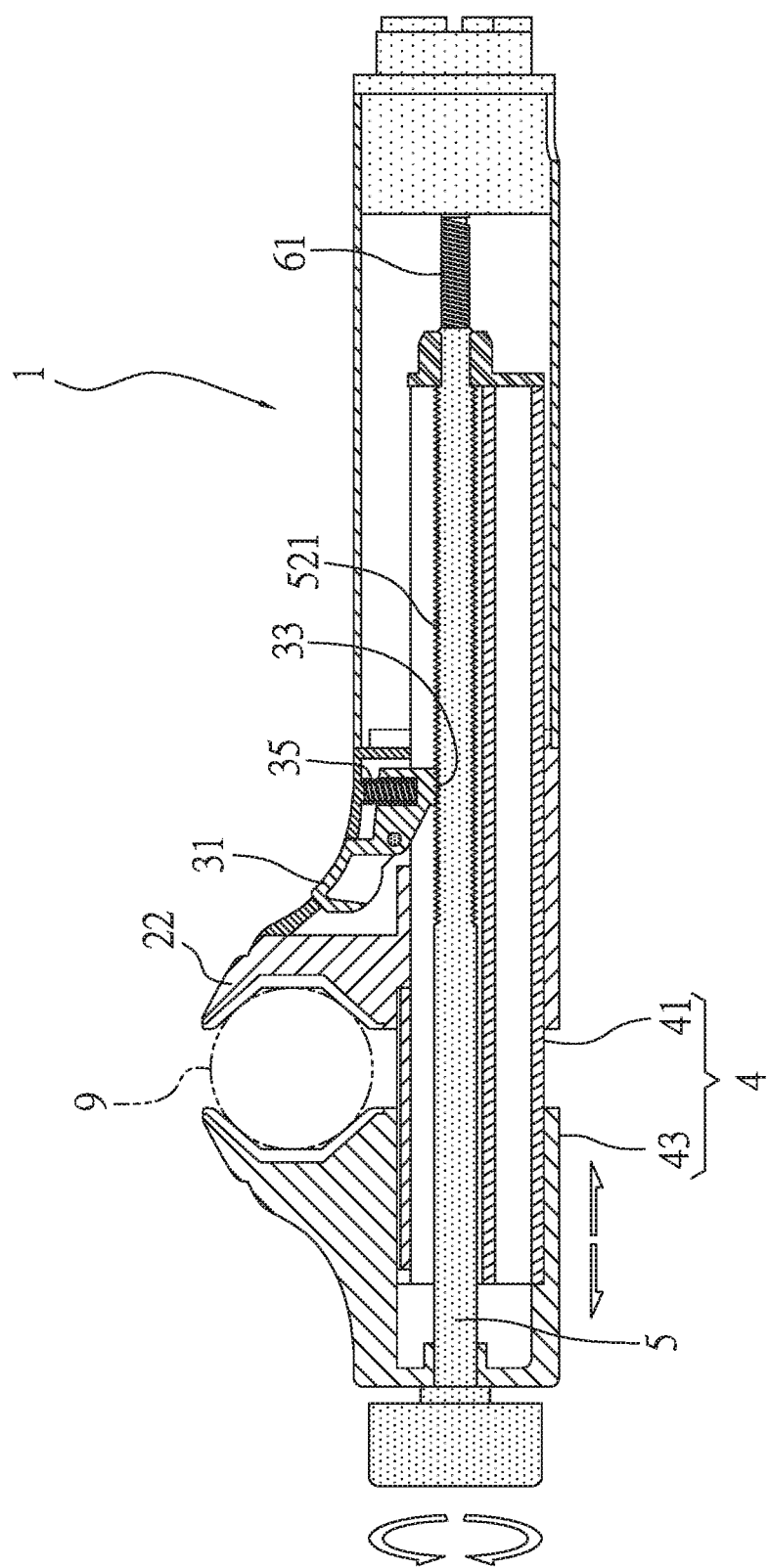
FIG. 4 is a cross sectional view showing the operation of the bicycle repair stand according to the preferred embodiment of the present invention.
Figure 5:
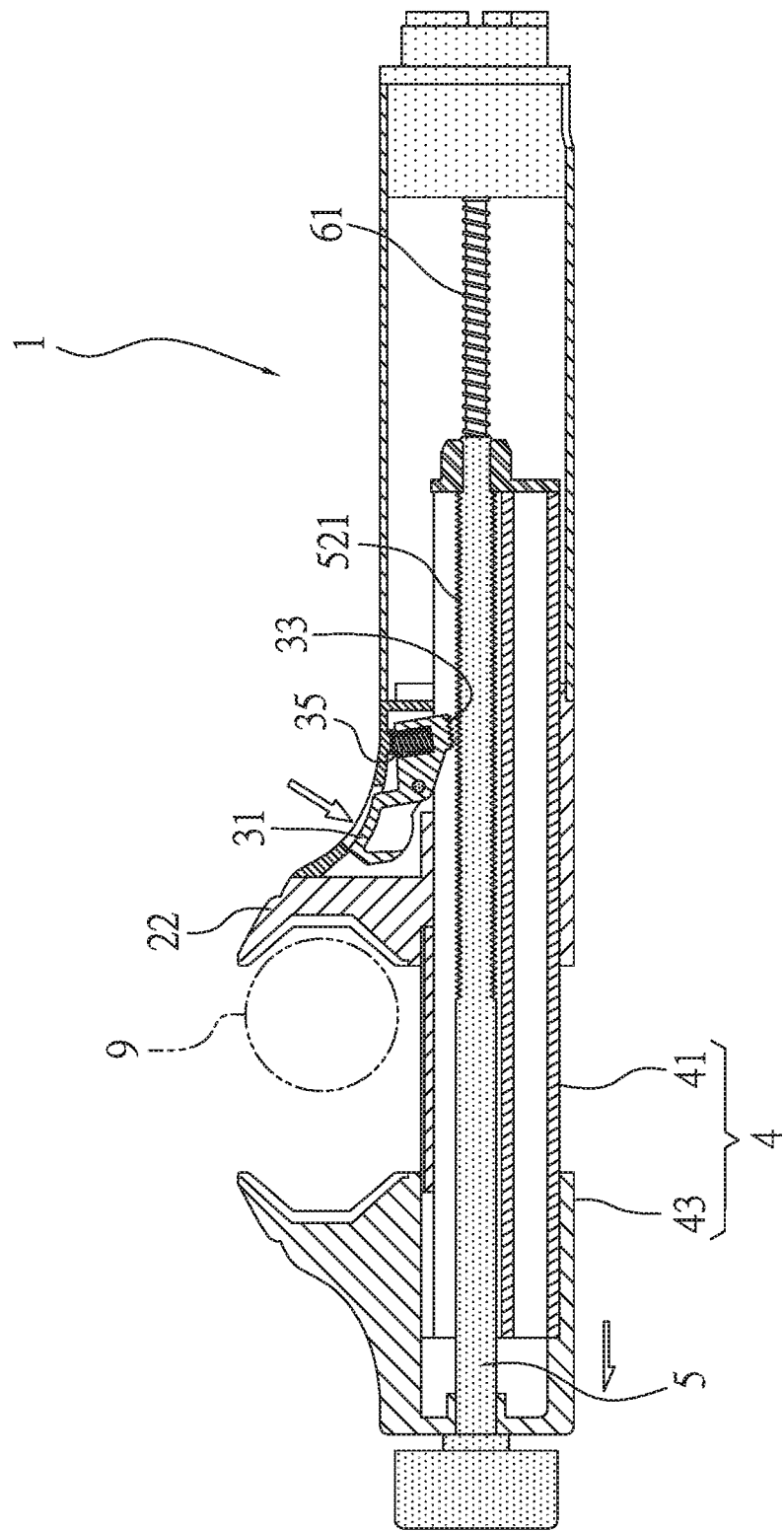
FIG. 5 is another cross sectional view showing the operation of the bicycle repair stand according to the preferred embodiment of the present invention.

After rotating the respective screw bolt 5, the projected tooth 33 engages with and drives the threads 521 to move the respective screw bolt 5, and the respective movable drive member 4 is actuated by the respective screw bolt 5 to adjust the movable fixing portion 43 to clamp a component 9 of a bicycle (not shown) by matching with the respective locking protrusion 22, thus checking and repairing the bicycle. In the meantime, a respective spring 35 (which is manufactured at a low cost and is operated easily) presses the respective engagement portion 32 to force the projected tooth 33 to engage with the threads 521, thus avoiding a removal of the projected tooth 33 from the threads 521, as shown in FIG. 4. When releasing an engagement of the movable fixing portion 43 with the component 9 of the bicycle, a respective button 31 is pressed to remove the projected tooth 33 from the threads 521, and the respective spring 35 pushes the respective movable drive member 4 to move forward, as illustrated in FIG. 5.

Figure 6:
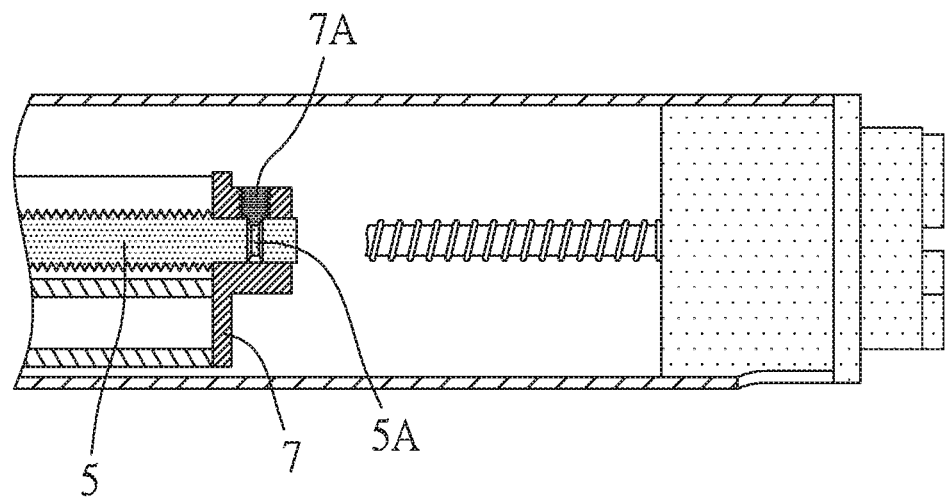
FIG. 6 is a cross sectional view showing the operation of a part of the bicycle repair stand according to the preferred embodiment of the present invention.
Figure 7:
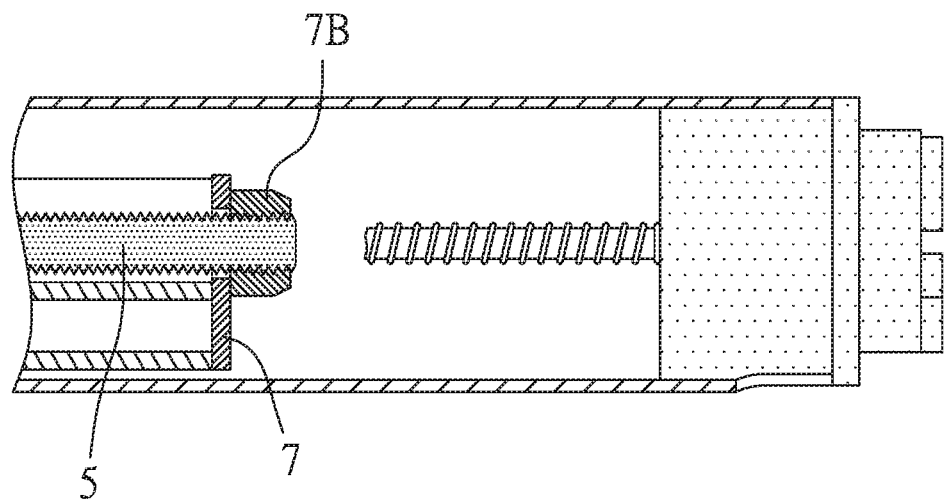
FIG. 7 is another cross sectional view showing the operation of a part of the bicycle repair stand according to the preferred embodiment of the present invention.

A distal end of the respective screw bolt 5 is mounted in many manners, for example, a locating ring 5A is provided on the distal end of the respective screw bolt 5, and the respective support element 7 has a socket set screw 7A configured to engage into the locating ring 5A, such that the respective screw bolt 5 is mounted stably and firmly, as shown in FIG. 6. In another embodiment, after the distal end of the respective screw bolt 5 is inserted through the respective support element 7, a nut 7B is rotatably connected with the respective screw bolt 5, thus fixing the distal end of the respective screw bolt 5, as illustrated in FIG. 7.

Figure 8:
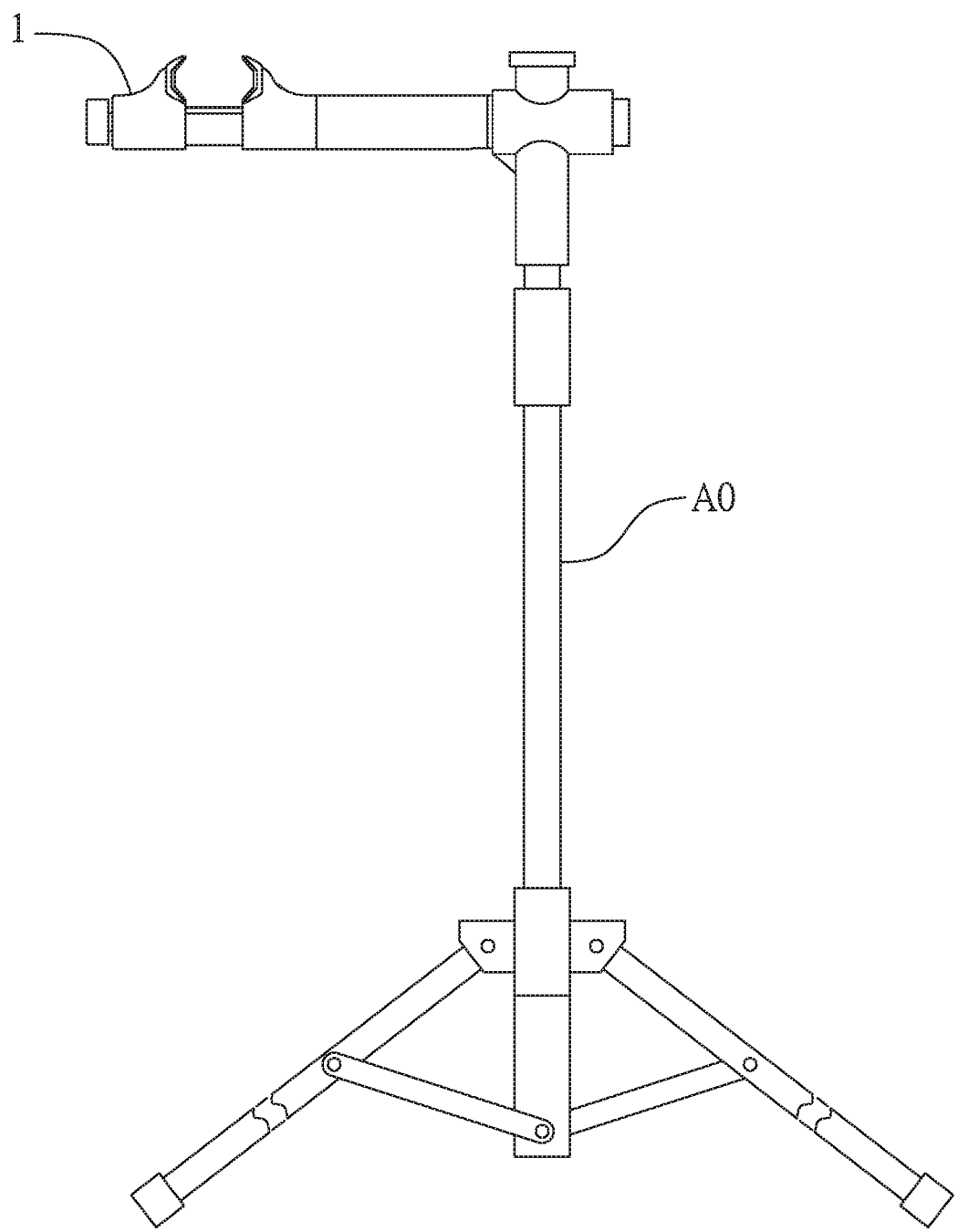
FIG. 8 is a side plane view showing the application of the bicycle repair stand according to the preferred embodiment of the present invention.
Figure 9:
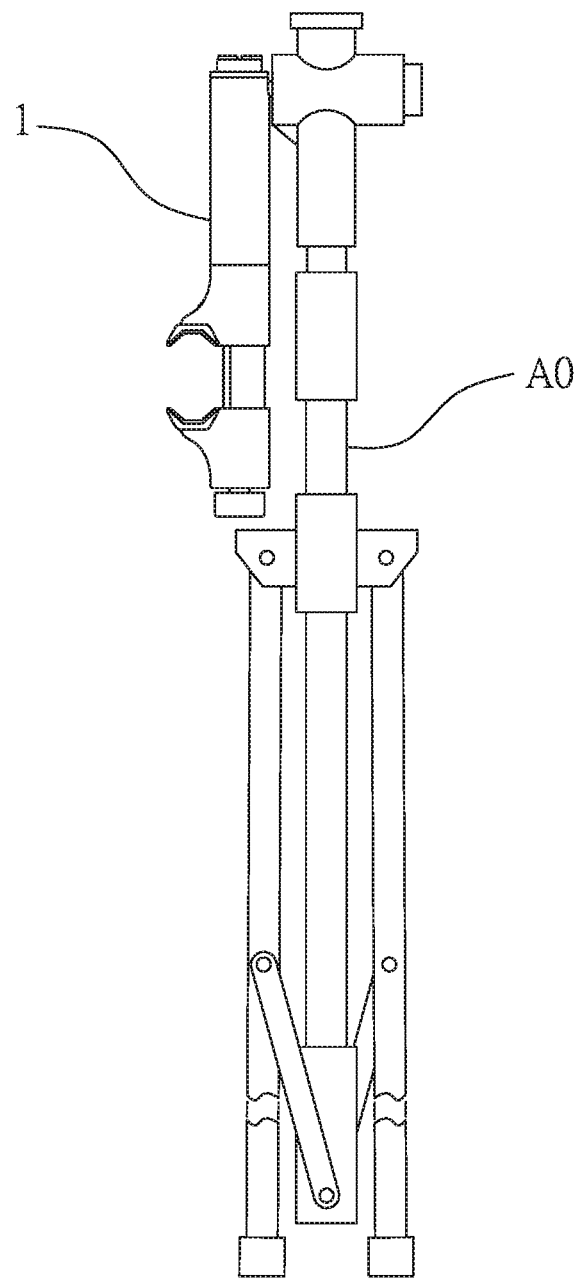
FIG. 9 is another side plane view showing the application of the bicycle repair stand according to the preferred embodiment of the present invention.

Accordingly, related components of the bicycle repair stand 1 are manufactured at the low cost and are connected easily and securely, thus producing a supporting rack AO economically. When the supporting rack AO is connected with the bicycle repair stand 1, the bicycle repair stand 1 is fixed on the supporting rack AO horizontally, as shown in FIG. 8. When the bicycle repair stand 1 is not used, it is rotated downward to retract with the supporting rack AO, as shown in FIG. 9.

The related components of the bicycle repair stand 1 are manufactured at the low cost and are connected easily and securely. The respective spring 35 (which is manufactured at the low cost and is operated easily) presses the respective engagement portion 32 (which is produced at the low cost) to force the projected tooth 33 to engage with the threads 521, thus avoiding the removal of the projected tooth 33 from the threads 521 of the respective screw bolt 5, when the respective screw bolt 5 drives the respective movable drive member 4 to move. When releasing the engagement of the movable fixing portion 43 with the component 9 of the bicycle, the respective button 31 is pressed to remove the projected tooth 33 from the threads 521, and the respective spring 35 pushes the respective movable drive member 4 to move forward.

While various embodiments in accordance with the present invention have been shown and described, it is clear to those skilled in the art that further embodiments may be made without departing from the scope of the present invention.

What is claimed is:

1. A bicycle repair stand comprising:
a fitting sleeve, a retainer, a presser, at least one movable drive member, at least one screw bolt, and at least two positioning elements;
wherein the fitting sleeve includes a channel passing therethrough and a connection portion formed on a rear end of the respective fitting sleeve and configured to close the channel;
wherein the retainer is engaged with a front end of the fitting sleeve, and the retainer includes a slidable conduit communicating with the channel of the fitting sleeve, at least one locking protrusion extending from a top of the retainer, and a press chamber formed on a rear end of a respective locking protrusion, wherein the press chamber has a cover covered on a top thereof, at least one pressing orifice defined on a front end of the cover, at least one coupling orifice defined on a bottom of the press chamber and communicating with the slidable conduit, at least one receiving orifice defined on a rear end of the cover and extending between a respective pressing orifice and a respective coupling orifice, and a connection shaft received in a respective receiving orifice;
wherein the presser is rotatably connected in the press chamber by ways of the connection shaft, and the presser includes at least one button obliquely extending upward from a front end thereof, at least one engagement portion extending into the slidable conduit downward via the respective coupling orifice, a projected tooth formed on a bottom of a respective engagement portion, at least one groove defined on a top of the respective engagement portion and corresponding to the projected tooth, and at least one resilient element accommodated in the at least one groove and abutting against the respective retainer;
wherein a respective movable drive member includes at least one sidle portion formed on a rear end thereof, and a respective slide portion extends into the channel of the respective fitting sleeve via the slidable conduit, at least one trench defined on a top of the at least one sidle portion and configured to receive the at least one engagement portion, and a movable fixing portion formed on a front end of the respective movable drive member and corresponding to the respective locking protrusion;
wherein a respective screw bolt is rotatably connected with the movable fixing portion, and the respective screw bolt includes a ratable handle mounted on a front end of the movable fixing portion, a threaded section formed on a rear end of the respective screw bolt which passes through the movable fixing portion, wherein the screwing section has threads formed thereon and engaged with the projected tooth of a respective engagement portion;
wherein a respective positioning element is connected with the connection portion and extends into the channel via the connection portion, wherein the respective positioning element includes a spring fitted thereon and abutting against a respective sidle portion.

2. The bicycle repair stand as claimed in claim 1, wherein the respective sidle portion has at least one support element fixed on a rear end thereof, and a respective support element has at least one first aperture; the respective screw bolt further includes a defining portion formed on a rear end thereof and rotatably connected with a respective first aperture.

3. The bicycle repair stand as claimed in claim 1, wherein the respective sidle portion has at least one support element fixed on a rear end thereof, and a respective support element has at least one first aperture, a respective supporting portion has two second apertures defined on two sides thereof and coupling with the respective positioning element, and a respective second aperture contacts with the spring; the respective screw bolt further includes a defining portion formed on a rear end thereof and rotatably connected with a respective first aperture.

4. The bicycle repair stand as claimed in claim 1, wherein the respective sidle portion has at least one support element fixed on a rear end thereof, a respective support element has at least one first aperture, and two supporting portions extending outward from two sides of a respective support element, wherein a respective supporting portion has a second aperture defined thereon and coupling with the respective positioning element, and the second aperture contacts with the spring; the respective sidle portion has two recesses defined on two sides thereof and configured to accommodate the two supporting portions, wherein the respective positioning element is screwed with the respective retainer via a respective recess, and the respective screw bolt further includes a defining portion formed on a rear end thereof and rotatably connected with a respective first aperture.

\* \* \* \* \*